United States Patent
Wang (10) Patent No.: US 6,577,789 B1
(45) Date of Patent: Jun. 10, 2003

(54) DOUBLE-PASS OPTICAL AMPLIFIERS AND OPTICAL NETWORK EQUIPMENT

(75) Inventor: Chia-Chi Wang, Hillsborough, NJ (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 10/013,364

(22) Filed: Dec. 13, 2001

Related U.S. Application Data
(60) Provisional application No. 60/324,520, filed on Sep. 26, 2001.

(51) Int. Cl.⁷ .................................................. G02B 6/26
(52) U.S. Cl. ............................. 385/27; 385/24; 385/46; 359/341.1; 372/6
(58) Field of Search ............................... 385/27, 24, 46, 385/28, 31; 359/341.1, 341.2, 341.3, 341.33, 337.5; 372/6, 18, 50, 97

(56) References Cited

U.S. PATENT DOCUMENTS

| | | | |
|---|---|---|---|
| 5,260,816 A | 11/1993 | Edagawa et al. | 359/341 |
| 5,453,873 A | 9/1995 | Millar et al. | 359/341 |
| 5,513,029 A | 4/1996 | Roberts | 359/177 |
| 5,526,175 A * | 6/1996 | Minelly et al. | 359/341.1 |
| 5,673,280 A | 9/1997 | Grubb et al. | 372/3 |
| 5,838,487 A | 11/1998 | Nilsson et al. | 359/341 |
| 5,859,938 A | 1/1999 | Nabeyama et al. | 385/24 |
| 5,861,973 A | 1/1999 | Inagaki et al. | 359/341 |
| 5,900,969 A | 5/1999 | Srivastava et al. | 359/341 |
| 6,049,413 A | 4/2000 | Taylor et al. | 359/337 |
| 6,061,171 A | 5/2000 | Taylor et al. | 359/341 |
| 6,081,366 A | 6/2000 | Kidorf et al. | 359/341 |
| 6,094,298 A | 7/2000 | Luo et al. | 359/346 |
| 6,115,174 A | 9/2000 | Grubb et al. | 359/334 |
| 6,134,047 A | 10/2000 | Flood et al. | 359/341 |
| 6,178,038 B1 | 1/2001 | Taylor et al. | 359/341 |
| 6,198,572 B1 | 3/2001 | Sugaya et al. | 359/337 |
| 6,215,581 B1 | 4/2001 | Yadlowsky | 359/337 |
| 6,222,962 B1 | 4/2001 | Nilsson | 385/37 |
| 6,417,961 B1 * | 7/2002 | Sun et al. | 359/337.5 |
| 6,433,921 B1 * | 8/2002 | Wu et al. | 359/341.33 X |
| 6,504,973 B1 * | 1/2003 | DiGiovanni et al. | 385/27 |

FOREIGN PATENT DOCUMENTS

| | | | |
|---|---|---|---|
| EP | 0 734 105 A2 | 9/1996 | H01S/3/06 |
| WO | 00/14909 | 3/2000 | |
| WO | 00/49721 | 8/2000 | |

OTHER PUBLICATIONS

Delavaux et al. "Optimized Two–State In–Line Balanced Optical Amplifier Design" Academic press, p. 239–243 (1995).

(List continued on next page.)

*Primary Examiner*—Phan T. H. Palmer
(74) *Attorney, Agent, or Firm*—G. Victor Treyz (57) ABSTRACT

Optical amplifiers and other optical network equipment for handling optical data signals in fiber-optic communications links are provided. Optical fiber that is pumped by laser diode pumps may be used to provide optical gain. A circulator may be used in an amplifier to direct the optical data signals through a double-pass portion of the amplifier. A reflector at the end of the double-pass portion of the amplifier may direct forward-propagating optical data signals from the circulator in the backwards direction. Optical components such as spectral filters, and attenuators, gain stages, access ports, and other components may be located in the double-pass portion. A control unit may be used to suppress gain transients in the double-pass portion.

20 Claims, 7 Drawing Sheets

OTHER PUBLICATIONS

Sun et al. Optical Fiber Amplifiers for WDM Optical Networks: Bell Labs Journal, p. 187–206, Jan.–Mar., 1999.

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" 20th Optical Amplifiers with their Applications Technical Digest, Jun. 9–11, 1999.

Takeda et al. "Active Gain Tilt Equalization by Preferentially 1.43$\mu$m– or 1.48 $\mu$m– Pumped Raman Amplification" OSA Optical Amplifiers and their Applications, vol. 30, p. 101–105 (1999).

Kahui et al. "Dynamic–Gain–Tilt–Free Long–Wavelength Band Erbium Doped Fiber Amplifiers Utilizing Temperature Dependent Characteristics of Gain Spectrum" 25th Optical Fiber communication Conference, Technical Digest, p. 6–8, (Mar. 8, 2000).

Masuda "Review of Wideband Hybrid Amplifiers" 24th Optical Fiber Communication Conference, Technical Digest, p. 2–4 (Mar. 7, 2000).

Lewis et al. "Low–Noise High Gain Dispersion Compensating Broadband Raman Amplifier" 25th Optical Fiber communication Conference, Technical Digest, p. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

\* cited by examiner

DOUBLE-PASS OPTICAL AMPLIFIERS AND OPTICAL NETWORK EQUIPMENT

This application claims the benefit of provisional patent application Ser. No. 60/324,520, filed Sep. 26, 2001.

BACKGROUND OF THE INVENTION

The present invention relates to fiber-optic communications networks, and more particularly, to optical communications links based on equipment such as optical amplifiers having double-pass arrangements in which optical signals traverse the same components in each of two passes.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic paths. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

It is an object of the present invention to provide improved optical network equipment such as optical amplifiers.

It is also an object of the present invention to provide optical network equipment such as optical amplifiers based on double-pass configurations in which the optical data signals being handled by the equipment travel forwards and backwards through at least some of the same components in the equipment.

SUMMARY OF THE INVENTION

These and other objects of the invention are accomplished in accordance with the present invention by providing optical amplifiers and other optical network equipment having optical gain stages for use in fiber-optic communications links in fiber-optic networks. The fiber-optic links may be used to carry optical data signals associated with wavelength-division-multiplexing channels.

The equipment may be based on a double-pass configuration. With this arrangement, at least part of the optical path through the equipment involves a region of optical components through which the optical data signals travel in both forward and backward directions. A reflector at one end of the path may be used to reflect forward-propagating optical data signals in the backwards direction.

Various components may be included in the double-pass region of the equipment. For example, gain stages, optical modules such as dispersion compensation modules, static and dynamic spectral filters, variable optical attenuators, and other components may be included in the double-pass path.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
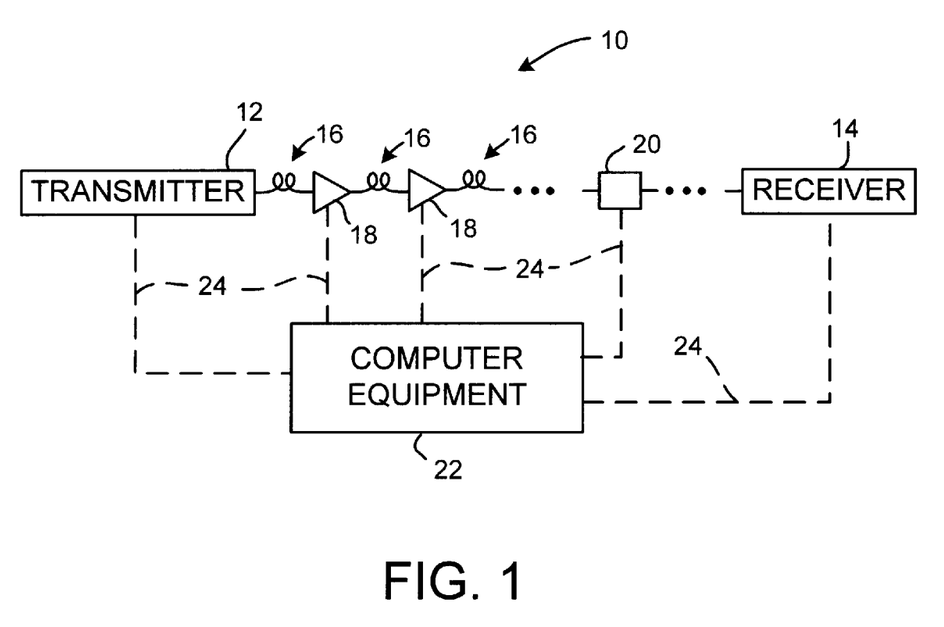
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of optical network equipment 20 having gain stages such as optical amplifiers 18. This is, however, merely illustrative. The features of the present invention may be used for any suitable optical network equipment if desired.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

Computer equipment 22 may use the gathered spectral information from this equipment or other suitable equipment in the network to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments. The spectral adjustments may be used to optimize the gain or signal spectrum flatness along link 10, may be used to optimize the end-to-end or node-to-node signal-to-noise ratio across the signal band or spectrum, may be used to implement spectral ripple control schemes, or may be used to implement any other suitable control or optimization functions for link 10.

Spectral adjustments may be made in the output power of transmitter 12 by adjusting a dynamic filter or variable optical attenuators in transmitter 12 to control the output powers of the channels in transmitter 12. Transmitter spectral adjustments may also be made by adjusting the strengths of the drive currents used to drive transmitter laser sources in transmitter 12. Spectral adjustments may be made in the input power for receiver 14 by adjusting a dynamic filter or variable optical attenuators before the received signals are processed by the detectors in receiver 14.

Spectral adjustments in amplifiers 18 and other equipment 20 may be made using dynamic filter arrangements, individual variable optical attenuators, variable optical attenuator arrays, gain stage adjustments, or any other suitable spectral adjustment arrangements.

Figure 2:
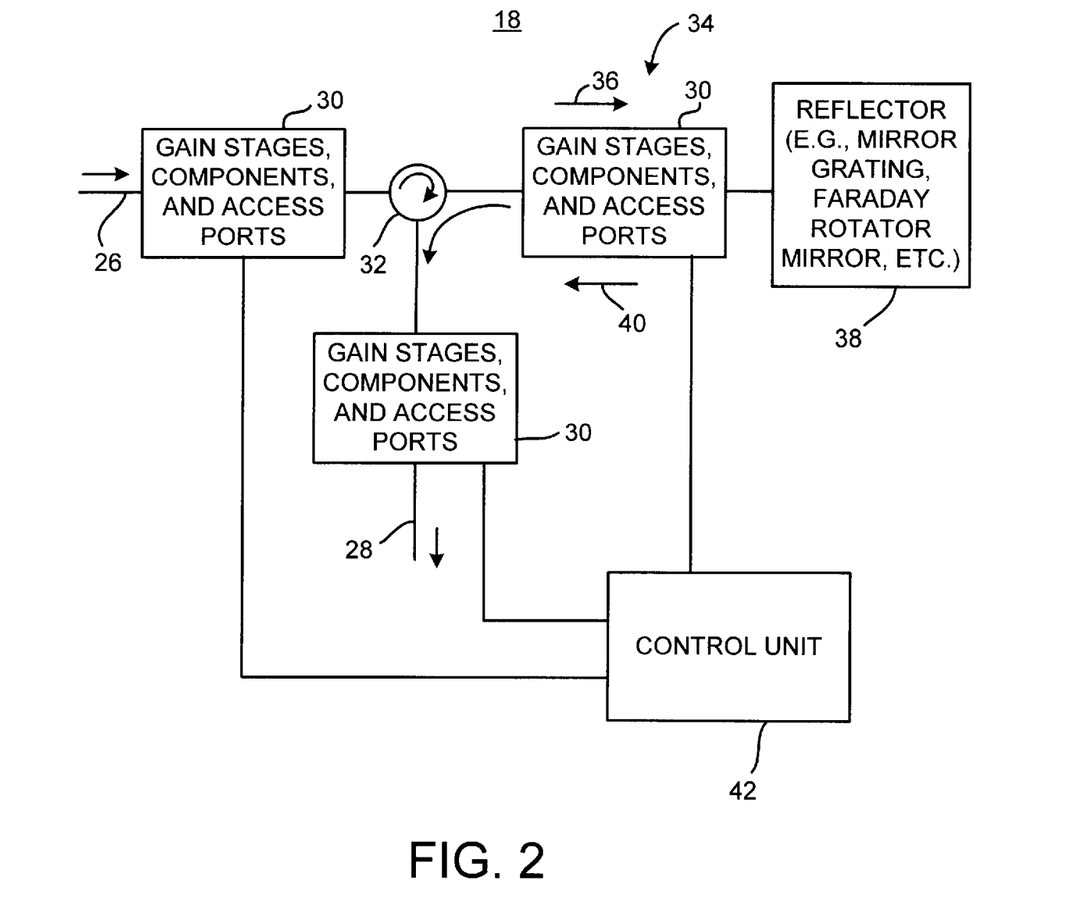
FIG. 2 is a schematic diagram of an illustrative optical amplifier having a double-pass portion in accordance with the present invention.

An illustrative optical amplifier 18 is shown in FIG. 2. Optical input signals may be provided to input fiber 26. The optical input signals may be, for example, data traffic being carried on the wavelength-division-multiplexing channels in the signal band of link 10 that is provided to input fiber 26 over a span of fiber 16. Corresponding optical output signals may be provided at output fiber 28. Output fiber 28 may, for example, be used to direct the optical output signals back into the transmission fiber of link 10.

Optical gain may be provided in amplifier 18 using optically-pumped fiber or other suitable gain media. Gain media and various optical components and access ports may, if desired, be provided at the illustrative locations between input fiber 26 and output fiber 28 that are shown by boxes 30 in FIG. 2. Not all of these locations 30 need be used. For example, only one or only two of the locations 30 may be used. Moreover, each location may only include gain stages, may only include other optical components, may only include an access port, or may include suitable combinations of gain stages, optical components, and access ports.

A circulator such as circulator 32 may be used to direct input light from fiber 26 into double-pass portion 34. Initially, the optical data signals exiting circulator 32 pass through various gain stages, components, and access ports in forwards direction 36. Upon reaching reflector 38, the optical data signals may be reflected toward circulator 32 in backwards direction 40. Reflector 38 may be any suitable component or portion of a component that reflects all or some of the optical data signals.

Reflector 38 may be, for example, a silver or dielectric mirror, a fiber grating, a Faraday rotator mirror, or any other suitable light reflecting structure. If a Faraday rotator mirror is used, the polarization of the reflected backwards-traveling light will be rotated by 90° relative to the polarization of the forwards-traveling light. As a result, the use of the Faraday rotator mirror may eliminate or at least mitigate or reduce polarization dependent optical effects such as polarization dependent loss and polarization dependent gain.

Circulator 32 may direct the backwards-traveling optical data signals that have been reflected from reflector 38 to output fiber 28 through any gain stages, components, and access ports that are used in the output branch of the amplifier. Although only one circulator 32 is shown in the arrangement of FIG. 2, amplifiers 18 may be provided that use multiple circulators and multiple double-pass portions. Moreover, four port circulator arrangements or circulators using more than four ports may be used if desired. In such arrangements, multiple arms of the circulator may be used as double-pass amplifier regions. For clarity, aspects of the present invention will be described primarily in the context of amplifiers having a single double-pass region and an associated three-port circulator, but this is merely illustrative.

The gain in locations 30 such as the amplifier input branch, double-pass portion 34, and the amplifier output branch may be provided using any suitable gain media. For example, gain may be provided by optically-pumped fiber or semiconductor optical amplifier devices. The optically-pumped fiber may be rare-earth-doped fiber such as erbium-doped fiber. Suitable pump wavelengths for optically pumping erbium-doped fiber include 980 nm and 1480 nm. The optically-pumped fiber may also be Raman-pumped fiber such as dispersion-compensating fiber or other suitable small-core-area fiber or other fiber that produces Raman gain when pumped with light about a Stokes shift in wavelength (13 THz in frequency) below the signal band.

The components used in locations 30 may include static and dynamic spectral filters. Such spectral filters may be used to modify the gain and power spectra of amplifier 18. Suitable static spectral filters may be formed using fiber gratings (e.g., fiber Bragg gratings), thin film filters, or any other suitable devices.

Dynamic filters may be referred to as a dynamic gain equalization or dynamic gain flattening filters, because dynamic filters may be used alone or in combination with a static spectral filter to flatten the gain spectrum of amplifier 18. In general, a dynamic spectral filter may be used to produce any desired spectral shape.

A dynamic filter may be formed using any suitable filter arrangement capable of producing a desired controllable loss (or gain) spectrum. Suitable filters may be based on microelectromechanical system (MEMS) devices, may be based on acoustooptic devices (e.g., acoustooptic fiber devices), may be based on thermo-optic arrayed waveguide devices, may be based on liquid crystals, may use electrooptic devices, may be based on semiconductor devices, may be based on electrooptically-induced or mechanically-induced gratings, may use controllable Raman pump lasers that pump dispersion-compensating fiber or other suitable fiber to produce a controllable Raman gain spectrum, or may be based on any other suitable dynamic filter arrangement.

Fiber-based filters may be based on tunable fiber Bragg grating mirrors or tunable fiber Bragg gratings that couple light into a fiber cladding mode. Fiber Bragg gratings may be formed by using acoustooptic modulation, by physically-inducing stresses (e.g., using a periodic comb structure that presses into the fiber), by etching into the fiber, or by using ultraviolet light and masks to produce periodic changes in the refractive index of the fiber. Fiber Bragg gratings may be tuned using heat or stress (e.g., stretching). These techniques are merely illustrative. Any suitable fiber-based dynamic filters may be used if desired. Dynamic filters may include filter elements that operate in transmission or reflection. Circulators or other structures may be used to allow reflective filter elements to be used in dynamic filters that are operated in transmission. Such circulators or other structures may be considered to be part of the dynamic filters.

Various additional components may be positioned at locations such as locations 30 along the optical path through an amplifier 18. These components may include isolators, taps and photodetectors for optical monitoring, filters (e.g., dynamic and static spectral filters), wavelength-division-multiplexing couplers, attenuators, dispersion-compensating elements such as dispersion-compensating fiber, gain stages, pumps, pump couplers, optical channel monitors, optical switches, etc. The operation of the components, gain stages, and components installed at the access ports at locations 30 or elsewhere may be controlled using control unit 42.

Control unit 42 may be based on any suitable control circuitry and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Control unit 42 may include communications circuitry that supports the communications between control unit 42 and computer equipment such as computer equipment 22 of FIG. 1 or other equipment in the network.

Amplifier 18 may be based on an optical network card and may use the communications circuitry to communicate with a controller mounted in a rack in which the card is mounted. The controller may be part of computer equipment 22 or may communicate with computer equipment 22. If desired, amplifier 18 may be implemented as a module that is part of an optical network card. The module may use the communications circuitry in unit 42 to communicate with a controller or other computer equipment 22 or to communicate with additional communications circuitry on the card that in turn supports communications with a controller or other computer equipment 22 in the network. These are merely illustrative communications arrangements that may be used to allow amplifier 18 to communicate with the equipment in the network. Any suitable arrangement may be used if desired.

With the amplifier arrangement of FIG. 2, the output power spectrum or gain spectrum of amplifier 18 may be controlled by using control unit 42 to adjust a dynamic filter (e.g., a dynamic spectral filter located in double-pass portion 34). Spectral information on the operation of amplifier 18 may be gathered using an internal optical channel monitor in amplifier 18 or using an external optical channel monitor in link 10. If an external optical channel monitor or other spectrum analyzer is used to gather spectral information for an amplifier 18, the spectral information may be provided to the control unit 42 in that amplifier 18 through computer equipment 22 or over any other suitable communications link. The spectral adjustments that are made by control units 42 in the amplifiers 18 with dynamic filters may be based on locally gathered spectral information and local control information and may be based on spectral information and control information received from other amplifiers or equipment or from the network management system.

Figure 3:
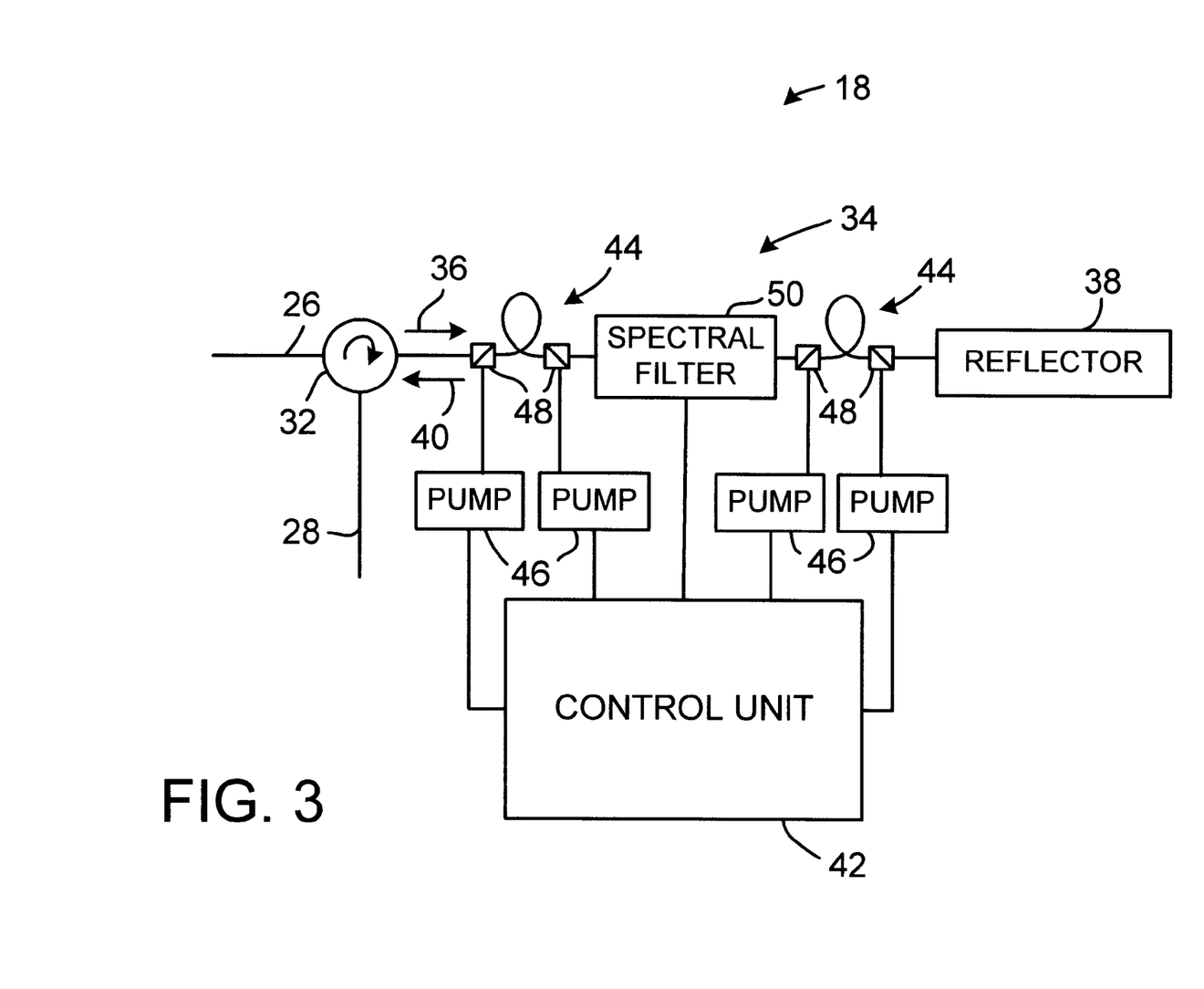
FIG. 3 is a schematic diagram of an illustrative optical amplifier having a double-pass portion that includes a spectral filter and gain media in accordance with the present invention.
Figure 4:
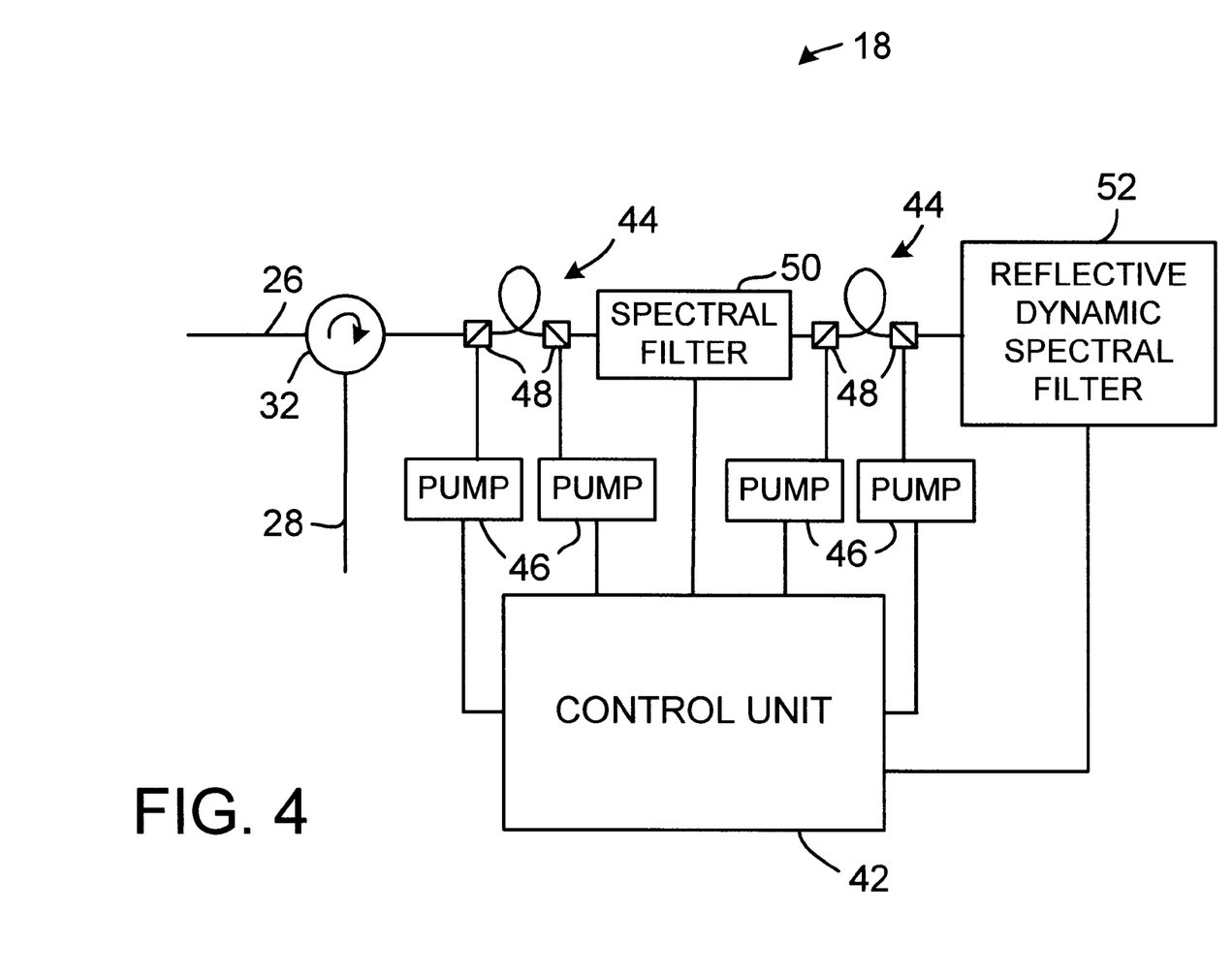
FIG. 4 is a schematic diagram of an illustrative optical amplifier having a double-pass portion that includes a reflective dynamic spectral filter in accordance with the present invention.

A schematic diagram of an illustrative optical amplifier is shown in FIG. 3. In the example of FIGS. 3–7, the gain stages, components, and access ports that may be optionally used on the input and output branches of amplifiers 18 are not shown to avoid over-complicating the drawings. Such gain stages, components and access ports may be used if desired.

As shown in FIG. 3, optical gain may be provided for the optical data signals traveling in double-pass portion 34 using coils of fiber 44. Fiber 44 may be Raman-pumped fiber or rare-earth-doped fiber. For clarity, aspects of the present invention will be described primarily in the context of gain stages or blocks that use erbium-doped fiber for providing optical gain. This is, however, merely illustrative. Gain may be provided by Raman pumped fiber, semiconductor optical amplifier devices, rare-earth-doped fiber gain stages based on rare-earth-doped fibers other than erbium-doped fibers, or any other suitable gain media.

Pump light for coils 44 may be provided using pumps 46. Pumps 46 may be laser diode pumps (e.g., 980 nm or 1480 nm pumps for pumping erbium-doped fiber) or any other suitable sources of pump light. Pump light from pumps 46 may be coupled into fiber 44 using pump couplers 48. Couplers 48 may be wavelength-division-multiplexing couplers or any other suitable pump couplers. In the example of FIG. 3, there are two gain stages in double-pass portion 34 and each gain stage uses both counterpumping and copumping. This is merely illustrative. Any suitable number of gain stages may be used in portion 34 or amplifier 18. For example, portion 34 may include one coil of fiber 44, two coils, three coils, or more than three coils. Each coil may be either copumped (pumped in direction 36), counterpumped (pumped in direction 40), or both copumped and counterpumped.

Amplifier portion 34 may include a spectral filter 50. Filter 50 may include one or more static spectral filters and one or more dynamic spectral filters or only a static or a dynamic filter. If multiple filter elements are used in filter 50, one or more gain stages such as erbium-doped fiber coil gain stages may be placed between these elements.

Because optical data signals pass twice through filter 50, the filtering impact of the filter's loss spectrum (or the filter's gain spectrum, if, for example, filter 50 is based on a filter design that uses multiple Raman pump wavelengths to create an adjustable Raman gain shape in filter 50) is effectively doubled. Filters such as filter 50 may be used to help flatten or otherwise shape the inherently non-flat or otherwise undesirable intrinsic gain shape associated with the gain media (e.g., the optically pumped erbium-doped fiber coils 44) in the amplifier.

When filter 50 is used in portion 34, filter 50 generally needs only to produce about half of the loss spectrum that would otherwise be required if filter 50 where used in a single-pass portion of the amplifier. This reduction in the dynamic range requirements for filter 50 may ease the manufacturing constraints imposed on the static or dynamic filters used in filter 50 and may therefore reduce costs and improve performance.

The gain stages of FIG. 3 are optional. When such a gain stage is used between spectral filter 50 and reflector 38, the loss associated with filter 50 becomes distributed amongst gain elements (i.e., gain from the coil 44 adjacent to reflector 38 is effectively distributed between the forwards-direction loss associated with filter 50 and the backwards-direction loss associated with filter 50). This may help to improve the noise figure performance of amplifier 18.

In the example of FIG. 3 and the other illustrative arrangements below, reflector 38 may be any suitable reflector. Using a Faraday rotator mirror as reflector 38 may help to reduce the effects of polarization-dependent gain and loss associated with the components used in portion 34. Any other suitable components may be used in portion 34 or elsewhere in the illustrative amplifiers of FIGS. 3–7. Such additional components are not generally shown together in FIGS. 3–7 to avoid over-complicating the drawings.

If a dynamic spectral filter is used, the filter may be based on a reflective or transmissive filter element. A reflective filter element may be combined with suitable coupling optics to provide a transmissive dynamic spectral filter. Such a transmissive dynamic spectral filter may be used, for example, in the location of spectral filter 50 of FIG. 3. A transmissive dynamic spectral filter that is based on a transmissive dynamic spectral filter element may also be used in the location of filter 50 of FIG. 3.

If desired, a reflective dynamic spectral filter may be used in the amplifier. Such a filter may be based on a reflective dynamic filter element or a transmissive filter element combined with suitable coupling optics. A reflective dynamic spectral filter may be placed at the end of the double-pass amplifier branch 34 in place of reflector 38, as shown by reflective dynamic spectral filter 52 of FIG. 4. With this arrangement, dynamic spectral filter 52 serves as a reflector for the double-pass portion of the amplifier. If dynamic spectral filter 52 is based on a reflective filter element, this arrangement may reduce the total number of circulators required in the amplifier.

Figure 5:
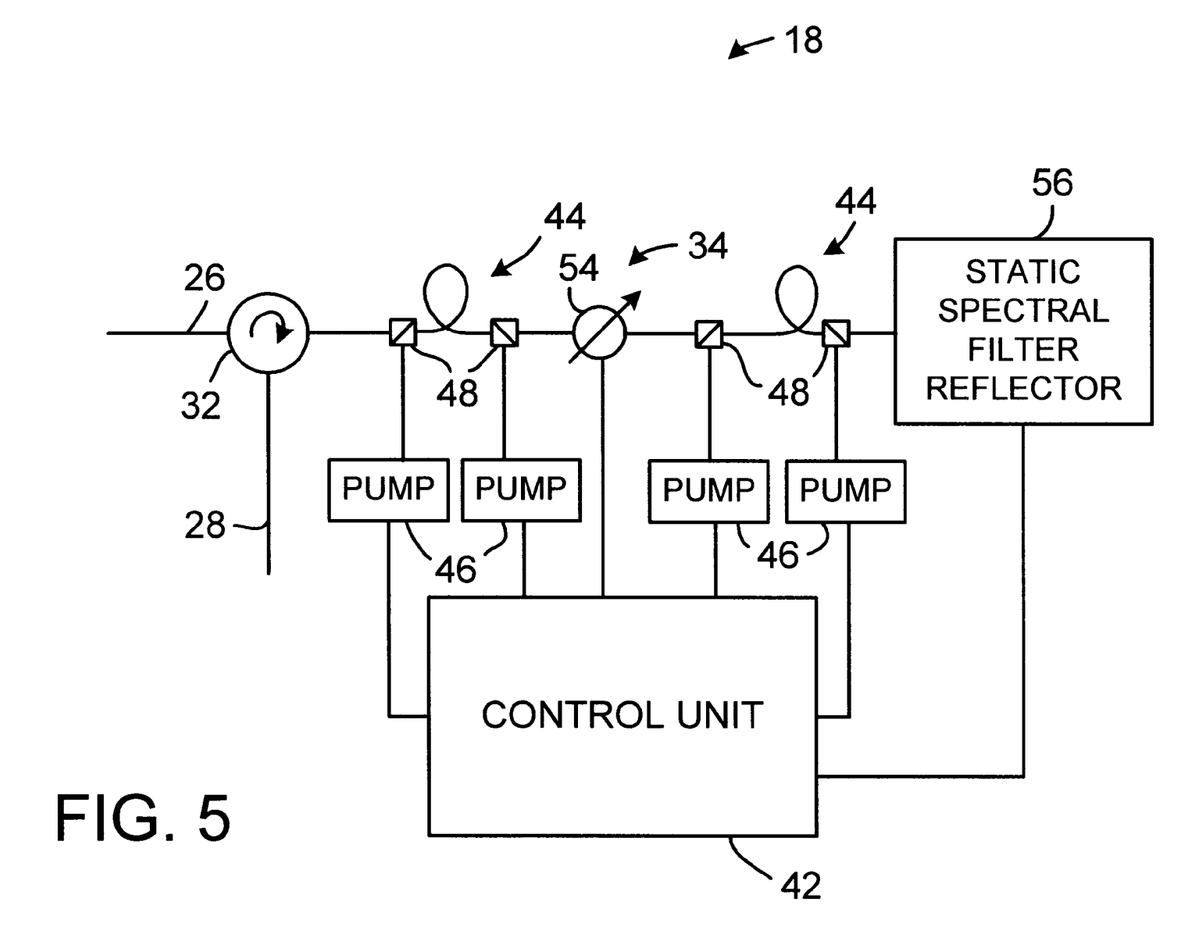
FIG. 5 is a schematic diagram of an illustrative optical amplifier having a double-pass portion that includes a variable optical attenuator and a reflector based on a reflective spectral filter in accordance with the present invention.

Another possible amplifier arrangement is shown in FIG. 5. In the example of FIG. 5, a variable optical attenuator 54 is used in portion 34. Because light passes through variable optical attenuator 54 in both the forwards and backwards directions, the dynamic range requirements for variable optical attenuator are effectively cut in half. This may lower costs.

In the illustrative configuration of FIG. 5, the function of the reflector is performed by a static spectral filter reflector 56. Filter 56 may be, for example, a fiber Bragg grating filter that operates in reflection rather than in transmission. Because the light is reflected from filter 56, there is no need for a separate reflector.

Figure 6:
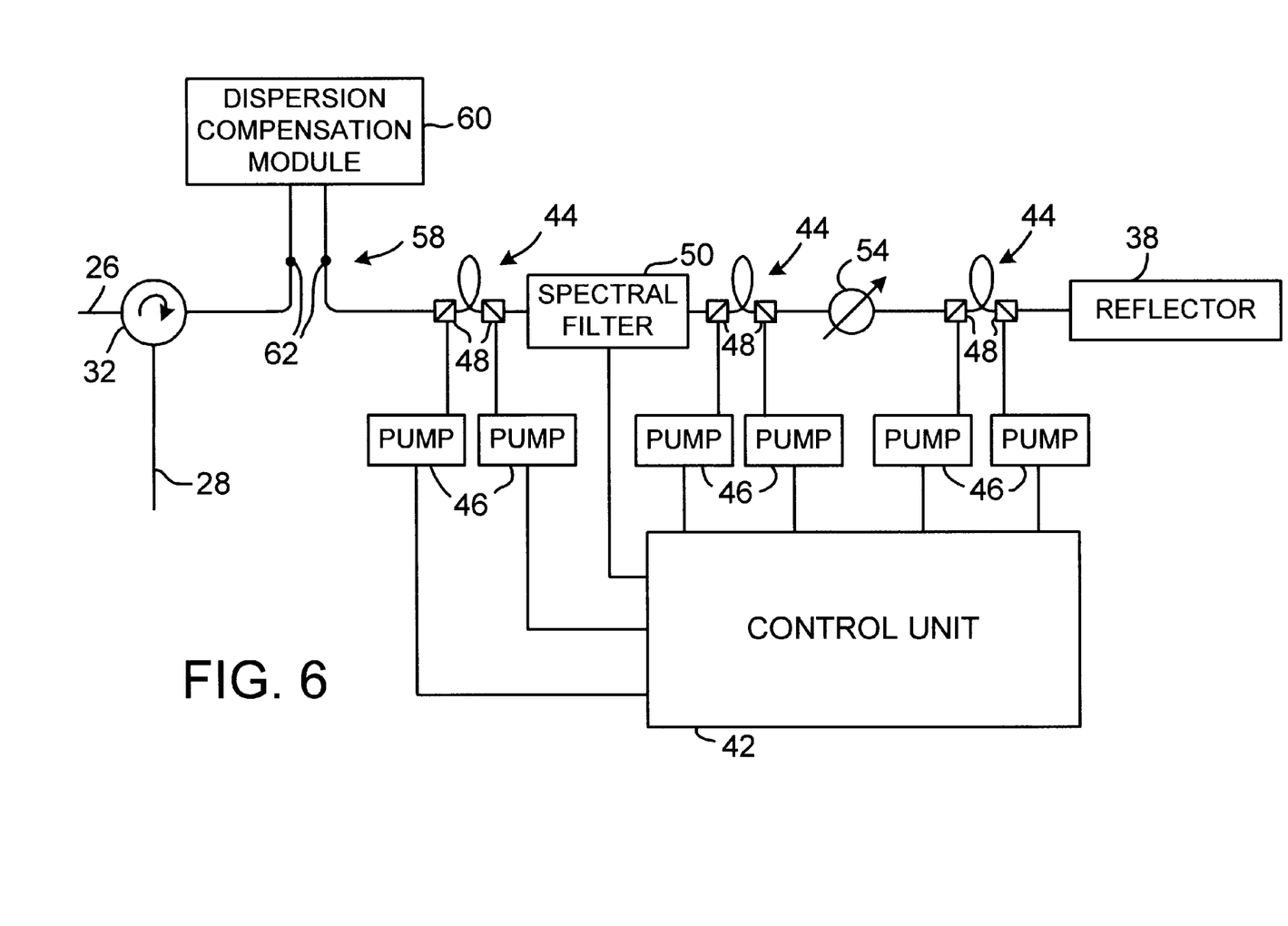
FIG. 6 is a schematic diagram of an illustrative optical amplifier having a double-pass portion that includes a module access port in accordance with the present invention.

One or more access ports may be provided in amplifier 18. For example, one or more access ports such as access port 58 of FIG. 6 may be provided to allow optical modules to be installed in amplifier 18. In the example of FIG. 6, a dispersion compensation module 60 has been installed at port 58, but this is merely illustrative. Suitable modules may include gain stages, dynamic or static filters, tunable and static dispersion compensation elements, switches, multiplexers, etc. Port 58 may use reusable connectors or other suitable connectors (shown as connectors 62 in FIG. 6) or fiber splices may be used to couple modules such as module 60 into amplifier 18 at port 58.

An advantage of installing modules in an access port such as port 58, is that the optical data signals will pass twice through module 60. If, for example, module 60 includes a coil of dispersion-compensating fiber, the length of the coil may be half of that that would otherwise be required. Reducing the length of the dispersion-compensating fiber in the coil will make module 60 smaller and less expensive.

If desired, the dispersion-compensating fiber may be optically pumped by one or more Raman pumps (e.g., diode lasers) having wavelengths that are about a Stokes shift in wavelength (13 THz in frequency) below the signal band in which the optical data signals are propagating. This Raman pumping may help produce gain that either leads to a net gain or at least offsets some of the optical losses that would normally be associated with using dispersion-compensating fiber. If reflector 38 is a Faraday rotator mirror, the 90° rotation that the rotator produces on the optical data signals may help to reduce the polarization dependence of the Raman gain produced in the Raman-pumped dispersion-compensating fiber. If desired, access ports may also be provided in the input branch of the amplifier between input 26 and circulator 32 or in the output branch of the amplifier between circulator 32 and output fiber 28.

Figure 7:
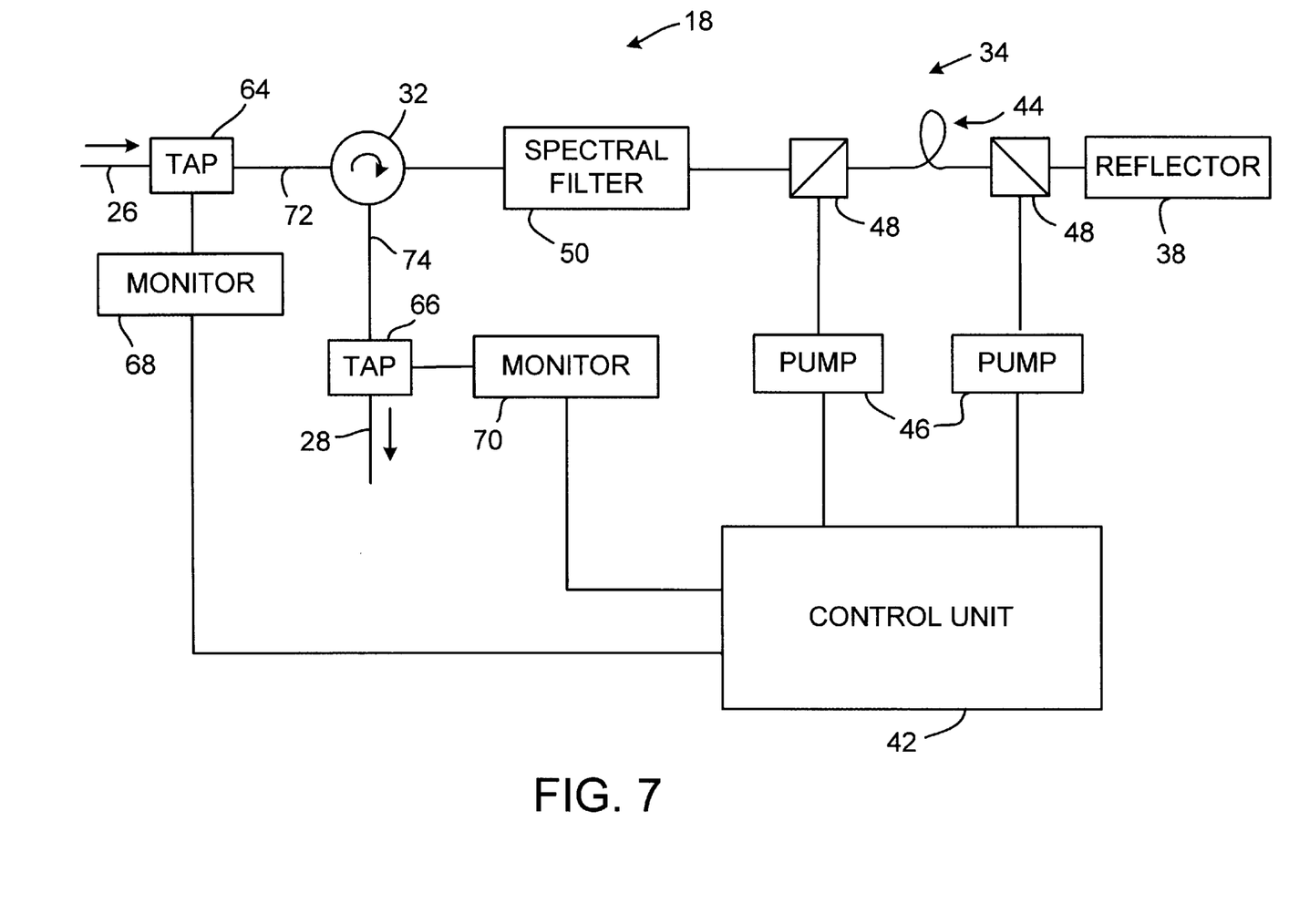
FIG. 7 is a schematic diagram of an illustrative optical amplifier having a double-pass gain stage with transient control capabilities in accordance with the present invention.

As shown in FIG. 7, optical taps such as taps 64 and 66 and corresponding optical monitors such as monitors 68 and 70 may be used to measure the input power of the optical data signals being provided to double-pass amplifier portion 34 and to measure the output power of the optical data signals being provided by portion 34. Taps 64 and 66 may tap a fraction (e.g., 2%) of the light propagating through the fiber at the input and the output of circulator 32 as shown in FIG. 7 or may tap light at any other suitable location in amplifier 18.

Tapped light from tap 64 may be measured using optical monitor 68. Tapped light from tap 66 may be measured using monitor 70. Monitors 68 and 70 may be based on photodetectors or any other suitable optical monitoring arrangement. Transimpedance amplifiers in monitors 68 and 70 or in control unit 42 may be used to convert current signals from the photodetectors in monitors 68 and 70 into voltage signals for processing by analog-to-digital converters or other suitable processing circuitry. The processing circuitry may be located in monitors 68 and 70 or in control unit 42.

With the arrangement of FIG. 7, tap 64 and monitor 68 may be used to measure the total input power of the signals received at circulator port 72 upstream from the gain stages in portion 34. Tap 66 and monitor 70 may be used to measure the total output power of portion 34 at circulator port 74 downstream from the gain stages in portion 34. Control unit 42 may use the input and output power measurements from these taps and monitors and other taps and monitors in amplifier 18 to suppress gain transients. Such gain transients may arise from sudden changes in the number of channels present on link 10 (e.g., due to a network reconfiguration or an accidental fiber cut). When signal and gain fluctuations are detected using the taps and monitors, control unit 42 may control the power of the pump light produced by the pumps 46 to ensure that the gain or output power associated with portion 34 (and amplifier 18) remains constant.

Any suitable control arrangement may be used to suppress gain transients based on measured tapped optical powers in the amplifier. For example, a feedback control loop may be used in which an error parameter is minimized. The error parameter may be calculated based on the difference between the measured ratio of the output power to the input power and the desired gain level. If desired, feed-forward control approaches in which the pump power is controlled based on the measured input power may be used in combination with such feedback control schemes or other suitable transient control schemes may be used.

It will be understood that the foregoing is merely illustrative of the principles of this invention, and that various modifications can be made by those skilled in the art without departing from the scope and spirit of the invention.

What is claimed is:

1. An optical amplifier used to amplify optical data signals provided to the optical amplifier from a fiber-optic communications link, comprising:
   an input fiber that receives the optical data signals from the fiber-optic communications link;
   an output fiber at which corresponding amplified optical data signals are provided;
   a double-pass portion having a first end and a second end;
   a reflector coupled to the second end of the double-pass portion; and
   a circulator having first, second, and third ports, wherein the first port receives the optical data signals that have been received by the input fiber, wherein the second port directs the optical data signals to the first end of the double-pass portion, and wherein the third port directs the optical data signals from the double-pass portion towards the output fiber, wherein the double-pass portion includes optically pumped erbium-doped fiber and at least one spectral filter between the first end and the second end.

2. The optical amplifier defined in claim 1 wherein the double-pass portion further comprises a variable optical attenuator.

3. The optical amplifier defined in claim 1 wherein the spectral filter comprises a dynamic spectral filter.

4. The optical amplifier defined in claim 1 wherein the spectral filter comprises a static spectral filter.

5. The optical amplifier defined in claim 1 further comprising an access port between the first end and the second end of the double-pass portion.

6. The optical amplifier defined in claim 1 further comprising dispersion-compensating fiber between the first end and the second end of the double-pass portion.

7. The optical amplifier defined in claim 1 further comprising Raman-pumped dispersion-compensating fiber between the first end and the second end of the double-pass portion.

8. The optical amplifier defined in claim 1 wherein the reflector comprises a static spectral filter reflector.

9. The optical amplifier defined in claim 1 wherein the double-pass portion includes at least two coils of optically-pumped rare-earth-doped fiber.

10. An optical amplifier used to amplify optical data signals provided to the optical amplifier from a fiber-optic communications link, comprising:
    an input fiber that receives the optical data signals from the fiber-optic communications link;
    an output fiber at which corresponding amplified optical data signals are provided;
    a double-pass portion having a first end and a second end;
    a reflective dynamic spectral filter coupled to the second end of the double-pass portion; and
    a circulator having first, second, and third ports, wherein the first port receives the optical data signals that have been received by the input fiber, wherein the second port directs the optical data signals to the first end of the double-pass portion, and wherein the third port directs the optical data signals from the double-pass portion towards the output fiber, wherein the double-pass portion includes optically pumped erbium-doped fiber.

11. The optical amplifier defined in claim 10 further comprising a static spectral filter in the double-pass portion between the first and second ends.

12. An optical amplifier used to amplify optical data signals provided to the optical amplifier from a fiber-optic communications link, comprising:
    an input fiber that receives the optical data signals from the fiber-optic communications link;
    an output fiber at which corresponding amplified optical data signals are provided;
    a double-pass portion having a first end and a second end;
    a reflector coupled to the second end of the double-pass portion;
    an access port located between the first and second ends of the double-pass portion; and
    a circulator having first, second, and third ports, wherein the first port receives the optical data signals that have been received by the input fiber, wherein the second port directs the optical data signals to the first end of the double-pass portion, and wherein the third port directs the optical data signals from the double-pass portion towards the output fiber.

13. The optical amplifier defined in claim 12 wherein the double-pass portion comprises optically-pumped rare-earth-doped fiber.

14. The optical amplifier defined in claim 12 further comprising a dispersion-compensation module connected to the access port so that the optical data signals pass twice through the dispersion-compensation module.

15. The optical amplifier defined in claim 12 wherein the reflector comprises a Faraday rotator mirror.

16. The optical amplifier defined in claim 12 further comprising a transmissive dynamic spectral filter between the first and second ends of the double-pass portion.

17. An optical amplifier used to amplify optical data signals provided to the optical amplifier from a fiber-optic communications link, comprising:
    an input fiber that receives the optical data signals from the fiber-optic communications link;
    an output fiber at which corresponding amplified optical data signals are provided;
    a double-pass portion having a first end and a second end;
    rare-earth-doped fiber in the double-pass portion between the first and the second ends;
    at least one pump that produces pump light that optically pumps the rare-earth-doped fiber at a pump power to produce optical gain;
    a reflector coupled to the second end of the double-pass portion;

a circulator having first, second, and third ports, wherein the first port receives the optical data signals that have been received by the input fiber, wherein the second port directs the optical data signals to the first end of the double-pass portion, wherein the third port directs the optical data signals from the double-pass portion towards the output fiber;

taps and monitors that measure optical powers upstream and downstream of the double-pass portion; and a control unit that controls the pump power based on the measured optical powers to suppress transients in the optical gain.

18. The optical amplifier defined in claim 17 further comprising a spectral filter in the double-pass portion.

19. The optical amplifier defined in claim 17 further comprising a dynamic spectral filter in the double-pass portion.

20. An optical amplifier used to amplify optical data signals provided to the optical amplifier from a fiber-optic communications link, comprising:

an input fiber that receives the optical data signals from the fiber-optic communications link;

an output fiber at which corresponding amplified optical data signals are provided;

a double-pass portion having a first end and a second end;

a static spectral filter reflector coupled to the second end of the double-pass portion; and a circulator having first, second, and third ports, wherein the first port receives the optical data signals that have been received by the input fiber, wherein the second port directs the optical data signals to the first end of the double-pass portion, and wherein the third port directs the optical data signals from the double-pass portion towards the output fiber, wherein the double-pass portion includes optically pumped erbium-doped fiber.

* * * * *